(12) United States Patent
Kinoshita et al.

(10) Patent No.: US 7,663,277 B2
(45) Date of Patent: Feb. 16, 2010

(54) INNER-ROTOR-TYPE BRUSHLESS MOTOR HAVING BUILT-IN BUS BAR

(75) Inventors: Nobuo Kinoshita, Matsudo (JP); Yuichiro Matsuoka, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 0 days.

(21) Appl. No.: 12/176,586

(22) Filed: Jul. 21, 2008

(65) Prior Publication Data

US 2009/0026859 A1 Jan. 29, 2009

(30) Foreign Application Priority Data

Jul. 24, 2007 (JP) ............................. 2007-192070

(51) Int. Cl.
*H02K 11/00* (2006.01)
(52) U.S. Cl. ...................................... 310/71; 310/68 B
(58) Field of Classification Search ................... 310/71, 310/68 B
See application file for complete search history.

(56) References Cited

U.S. PATENT DOCUMENTS

| | | | | |
|---|---|---|---|---|
| 3,984,714 | A | * | 10/1976 | Grozinger et al. ........... 310/194 |
| 4,287,446 | A | * | 9/1981 | Lill et al. ...................... 310/71 |
| 5,828,147 | A | * | 10/1998 | Best et al. ...................... 310/71 |
| 6,177,741 | B1 | * | 1/2001 | Lutkenhaus et al. ........... 310/71 |
| 6,856,055 | B2 | * | 2/2005 | Michaels et al. .............. 310/71 |
| 7,262,529 | B2 | * | 8/2007 | Klappenbach et al. ........ 310/71 |
| 7,498,702 | B2 | * | 3/2009 | Migita et al. ................... 310/71 |

FOREIGN PATENT DOCUMENTS

| | | |
|---|---|---|
| JP | 2002-125353 | 4/2002 |
| JP | 2006-094573 | 4/2006 |

* cited by examiner

*Primary Examiner*—Dang D Le
(74) *Attorney, Agent, or Firm*—McGlew and Tuttle, P.C.

(57) ABSTRACT

An inner-rotor-type brushless motor includes a bus bar which connects together U-phase, V-phase, and W-phase windings and connects them to output wires. The bus bar includes, as conductive members, three external terminals connected to first ends of the windings and one Y-connection terminal for connecting second ends of the windings together. The external terminals and the Y-connection terminal are disposed on the body of the bus bar such that the Y-connection terminal and the external terminals are located on one side on the circumference of the bus bar body, whereby the bus bar body has a circumferential region where the conductive members are not present. A sensor bard carrying a position detection sensor is attached the bus bar body such that the position detection sensor is located in the circumferential region where the conductive members are not present.

10 Claims, 10 Drawing Sheets

EXTERNAL TERMINAL (WIRING BAR)

Y-CONNECTION TERMINAL (WIRING BAR)

SENSOR BOARD

POSITION DETECTION SENSOR

SENSOR BOARD

BUS BAR LEG

BUS BAR BODY

Y-CONNECTION TERMINAL (WIRING BAR)

BUS BAR LEG

SENSOR BOARD

EXTERNAL TERMINAL (WIRING BAR)

ROTOR MAGNETIC POLES: 6 POLES
STATOR MAGNETIC POLES: 9 POLES

ROTOR

ROTOR MAGNETIC POLES: 12 POLES
STATOR MAGNETIC POLES: 9 POLES

ROTOR

INNER-ROTOR-TYPE BRUSHLESS MOTOR HAVING BUILT-IN BUS BAR

BACKGROUND OF THE INVENTION

1. Field of the Invention

The present invention relates to an inner-rotor-type brushless motor in which a sensor board for detecting rotation of a rotor is attached to a bus bar which connects together U-phase, V-phase, and W-phase windings wound on a stator magnetic pole core and connects them to output wires.

2. Description of the Related Art

In an inner-rotor-type brushless motor, a sensor attached to a stator detects magnet poles provided on the rotor side so as to switch and control currents supplied to stator windings. When such a brushless motor is used for driving electrical tools or other electrical equipment which requires supply of relatively large current to the motor, a bus bar has conventionally been used for connecting wiring from an external power source to the windings.

The brushless motor is configured such that the bus bar attached to the stator and the sensor for rotation detection are individually arranged in the thrust direction. FIG. 12 shows a longitudinal cross section of a motor disclosed in Japanese Patent Application Laid-Open (kokai) No. 2002-125353. The illustrated motor includes a cylindrical rotor rotatably assembled into a housing via bearings at opposite ends of the housing; a stator coaxially disposed around the rotor; and a sensor for detecting the rotational phase of the rotor. The stator includes a cylindrical core; a plurality of windings wound on the core; a bus bar (a coil connection structure) which connects respective end portions of the windings; and electricity supply terminals which are connected to the bus bar.

The disclosed motor has a problem in that the bus bar and the sensor component individually arranged in the thrust direction increases the entire length of the motor, to thereby increase the size of the motor. Further, since the sensor must be attached to the housing, the number of components increases, thereby increasing cost and the number of manufacturing steps. In addition, the disclosed motor has a structure in which the number of cumulative errors increases, and thus, the sensor encounters difficulty in attaining high sensing accuracy. Such a structure decreases torque and increases torque ripples.

There is also known a motor having a structure in which a sensor is mounted onto a bus bar so as to reduce the size of the motor (see Japanese Patent Application Laid-Open (kokai) No. 2006-94573). FIG. 13 shows a portion of the structure of a stator which is fitted into a housing of a brushless motor disclosed in this publication. Conductive wires are wound on the core of the stator so as to form windings (not shown). The bus bar has a cylindrical portion which is provided on the lower side thereof and fitted into a central opening of the core. Lead wires extending from unillustrated windings corresponding to teeth are connected to respective connection terminals. The bus bar is positioned in relation to the core by means of a plurality of leg portions provided on the outer circumference of the bus bar.

Meanwhile, Hall elements are inserted into and held in corresponding recesses of a sensor holder; the leads of the Hall elements are inserted into holes of a circuit board which carries other electronic components; and the sensor holder is then fixed to the circuit board. Thus, the sensor elements mounted on the bus bar can detect magnetic poles by detecting sensor-dedicated magnets provided on the rotor side.

However, the conventional motor has a problem in that copper bars and connection terminals embedded in the bus bar generate heat, and lower the reliability of the sensors attached to the bus bar. The copper bars embedded in the bus bar serve as internal wiring for connecting leads from the windings to the corresponding connection terminals. A current (several A to several tens of A) for driving the motor flows into the windings via the copper bars and the connection terminals so that a motor torque is output. At that time, the copper bars and the connection terminals generate heat. Therefore, in the case where a semiconductor sensor, which is weak against heat, is mounted on or in the vicinity of the copper bars and the connection terminals, the reliability (in terms of breakage and service life) of the sensor lowers, and deteriorated sensor waveform causes a drop in torque, as well as an increase in torque ripples.

SUMMARY OF THE INVENTION

An object of the present invention is to provide a brushless motor whose size is reduced by means of mounting a sensor onto a bus bar, and which is configured such that even when copper bars or connection terminals incorporated into the bus bar generate heat, the generated heat is less likely to be transmitted to the sensor, to thereby prevent lowering of the reliability of the sensor.

An inner-rotor-type brushless motor according to the present invention includes a stator fixedly disposed within a motor casing; a rotor fixed to a rotation shaft; and a bus bar which connects together U-phase, V-phase, and W-phase windings wound on a stator magnetic pole core and connects them to output wires. The U-phase, V-phase, and W-phase windings are each composed of a plurality of coils which are wound around stator magnetic poles and are connected to form a Y-connection or a double Y-connection. The bus bar, which carries a sensor board including a position detection sensor fixed thereto, includes a generally circular bus bar body formed of a resin, and bus bar legs formed integrally with the bus bar body and used for fixing the bus bar. The bus bar includes, as conductive members for connecting the windings, only three external terminals connected to first ends of the windings and one Y-connection terminal for connecting second ends of the windings together. The first and second ends of the windings are pulled out to positions near winding-side terminal portions of the Y-connection and external terminals to which the first and second ends are to be connected, and are connected to the corresponding Y-connection and external terminals. The three winding-side terminal portions of the Y-connection terminal are disposed to be located adjacent to one another, the winding-side terminal portions of the three external terminals are disposed to be located adjacent to one another, and the Y-connection terminal and the external terminals are disposed to be located on one side on the circumference of the bus bar body, whereby the bus bar body has a circumferential region where the conductive members are not present. The sensor board is attached such that the position detection sensor is located in the circumferential region where the conductive members are not present.

In another inner-rotor-type brushless motor according to the present invention, the U-phase, V-phase, and W-phase windings are each composed of a plurality of coils which are wound around stator magnetic poles and are connected to form a D-connection. The bus bar, which carries a sensor board including a position detection sensor fixed thereto, includes a generally circular bus bar body formed of a resin, and bus bar legs formed integrally with the bus bar body and used for fixing the bus bar. The bus bar includes only three external terminals as conductive members for connecting the windings. The three external terminals include integrally-formed winding-side terminal portions, each connecting two of the first and second ends of the windings together. The first and second ends of the U-phase, V-phase, and W-phase windings are pulled out to positions near the winding-side terminal portions to which the first and second ends are to be connected, and are connected thereto so that the U-phase, V-phase, and W-phase windings form a D-connection. The three external terminals are disposed on the bus bar body such that the external terminals are located adjacent to one another, whereby the bus bar body has a circumferential region where the conductive members are not present. The sensor board is attached such that the position detection sensor is located in the circumferential region where the conductive members are not present.

The stator, to which the bus bar is fixed by inserting the plurality of the bus bar legs into core grooves, is fixedly disposed within the cylindrical casing. The bus bar body has a length in the radial direction determined such that the bus bar body does not block inter-coil clearances. The bus bar body is disposed at a radial position near the rotor so as to form a clearance between the bus bar body and a cylindrical portion of the core, and the first and second ends of the windings are pulled out on the radially outer side of the bus bar body for connection. Alternatively, the bus bar body is disposed at a radial position corresponding to the cylindrical portion of the core, and the first and second ends of the windings are pulled out on the radially inner side of the bus bar body for connection.

Mutual connection between the plurality of coils which constitute each of the U-phase, V-phase, and W-phase windings is performed by means of direct serial connection such that a winding-ending-side end of a first coil and a winding-starting-side end of a second coil are serially connected, a winding-ending-side end of the second coil and a winding-starting-side end of a third coil are serially connected, and so on. The coils of three phases are continuously wound in the order of U-phase, V-phase, and W-phase or in the order of U-phase, W-phase, and V-phase. The number of rotor magnetic poles is 2n and the number of stator magnetic poles is 3n, or the number of rotor magnetic poles is 4n and the number of stator magnetic poles is 3n, where n is an integer of 2 to 6. Winding for each phase ends at a coil adjacent to a coil from which the winding has been started.

According to the present invention, the size of the brushless motor can be reduced by means of mounting the sensor onto the bus bar. In addition, since the sensor is separated from the heat generating portion of the bus bar, even when copper bars or connection terminals incorporated into the bus bar generate heat, the generated heat is less likely to be transmitted to the sensor. Therefore, the reliability (in terms of breakage and service life) of the sensor against current heat is improved, and drop in torque and torque ripples due to deteriorated sensor waveform can be prevented.

BRIEF DESCRIPTION OF THE DRAWINGS

FIGS. 5A and 5B are plan views of the bus bar, wherein FIG. 5A shows the bus bar alone, and FIG. 5B shows a state in which the bus bar is attached to the motor;

FIGS. 8A and 8B are diagrams showing electrical connection of the DC brushless motor, wherein FIG. 8A shows the overall electrical connection for the case of Y-connection, and FIG. 8B shows stator windings in double Y-connection;

FIGS. 9A and 9B are plan views of a bus bar different from the bus bar of FIGS. 5A and 5B, wherein FIG. 9A shows the bus bar alone, and FIG. 9B shows a state in which the bus bar is attached to the motor;

DETAILED DESCRIPTION OF THE PREFERRED EMBODIMENTS

Figure 1:
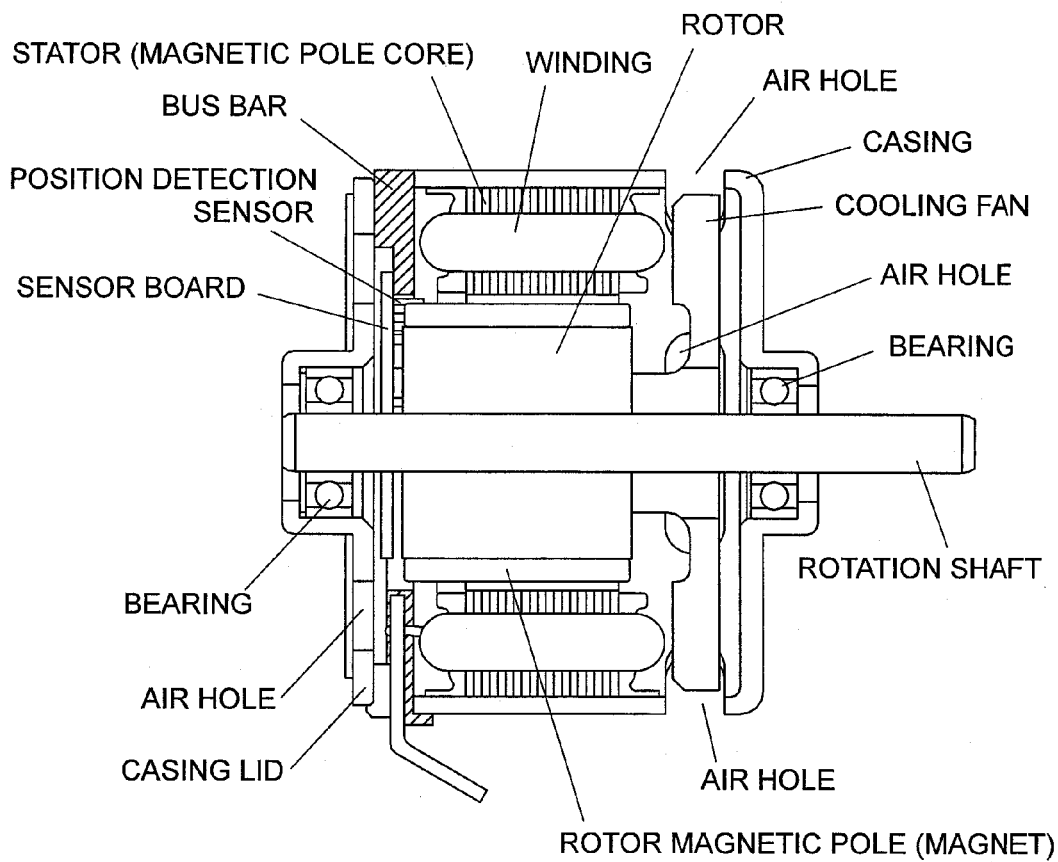
FIG. 1 is a cross sectional view showing the overall structure of a brushless motor which embodies the present invention.

The present invention will now be described by way of examples. FIG. 1 is a cross sectional view showing the overall structure of an inner-rotor-type brushless motor which embodies the present invention. A motor housing is composed of a bottomed, hollow cylindrical casing formed of a metal or a resin, and a casing lid formed of a metal or a resin and attached to the opening portion of the cylindrical casing. A stator is fixed to the inner wall surface of the cylindrical casing. The stator includes a magnetic pole core, and coils wound around the core via an insulating means such as an insulator. Bearings for supporting a rotation shaft of a rotor are fixedly accommodated in central portions of the casing bottom portion and the casing lid. One end of the shaft projects from the casing bottom portion toward the outside of the motor housing, and an external apparatus to be driven is connected to the projecting end.

In the brushless motor shown in FIG. 1, a cooling fan is fixed to the rotation shaft to be located at one end (e.g., on the side toward the casing bottom portion as illustrated) of the rotor. Air holes which partially form an air-flow passage extending through inter-coil clearances in magnetic pole core slots are formed in the motor housing to be located on opposite sides of the stator magnetic pole core. In the illustrated example, air holes are formed in the casing lid and are also formed in the cylindrical casing at positions located radially outward of the cooling fan. Further, the illustrated brushless motor includes a position detection sensor; a sensor board, to which the position detection sensor is attached; and a bus bar, to which the sensor board is attached, which will be described in detail later. In the example of FIG. 1, a sensor rotor dedicated for position detection is not provided, and the position detection sensor is disposed such that it detects the rotational position of the rotor by making use of rotor magnetic poles provided on the surface of the rotor. The rotor may be a surface-magnet-type rotor (SPM) or an embedded-magnettype rotor (IPM). In the case of the surface-magnet-type rotor, the magnets may be covered with heat-shrinkable tape for prevention of scattering.

Figure 2:
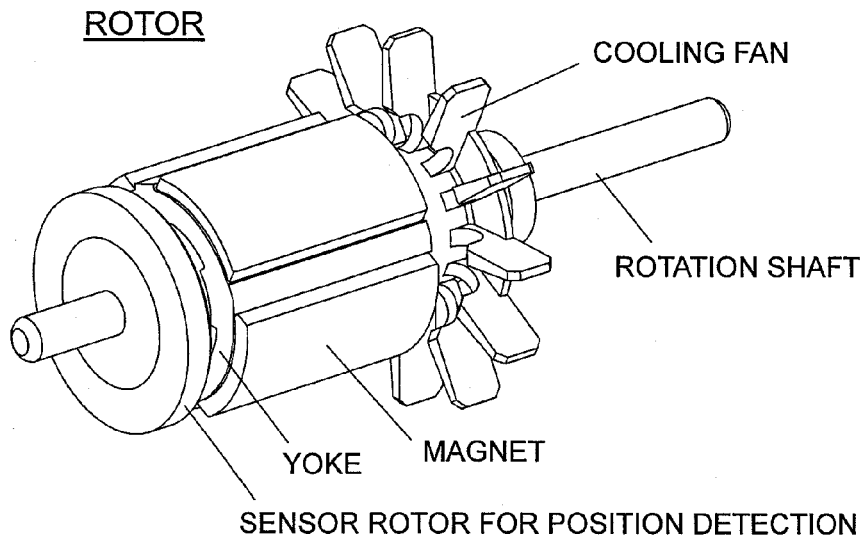
FIG. 2 is a perspective view exemplifying a rotor with a sensor rotor dedicated for position detection.

FIG. 2 is a perspective view exemplifying a rotor with a sensor rotor dedicated for position detection. In FIG. 2, the sensor rotor dedicated for position detection is fixed to the rotation shaft to be located on the side opposite the cooling fan. The cooling fan, which includes a plurality of blades fixed at equal intervals in the circumferential direction, may be an ordinary one used in this technical field. The rotor is composed of a yoke fixed to the rotation shaft, and a plurality of magnets (four magnets in the illustrated example), which serve as rotor magnetic poles, are attached to a surface of the yoke (rotor surface) which faces the stator magnetic pole core. The sensor rotor dedicated for position detection is formed of a sensor magnet which is magnetized to have four poles; i.e., alternating two N poles and two S poles at equal intervals. Magnetic flux generated by the sensor magnet (or the rotor magnet shown in FIG. 1) is detected by means of a position detection sensor, such as a Hall element, attached to the stator side, whereby the rotational position of the rotor can be detected.

Figure 3:
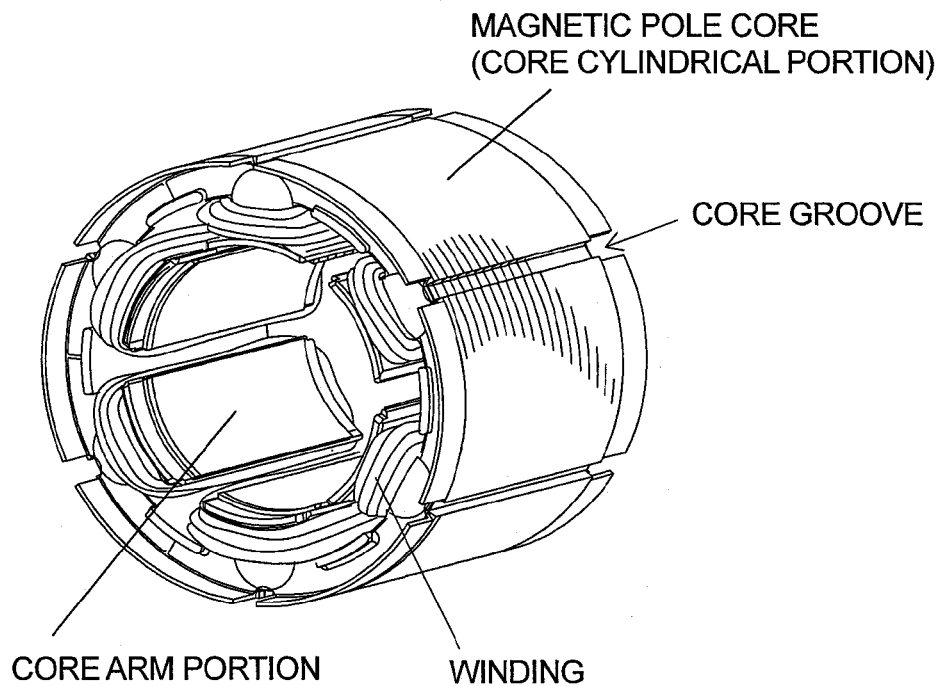
FIG. 3 is a perspective view exemplifying a stator composed of a magnetic pole core and windings.

FIG. 3 is a perspective view exemplifying a stator composed of a magnetic pole core and coils. The illustrated stator structure itself is ordinary one, and includes 6 stator magnetic poles. A bus bar, which will be described later, can be attached by making use of core grooves between the magnetic poles. The illustrated magnetic pole core has a core cylindrical portion fixedly disposed within the cylindrical casing, and six core arm portions integrally formed therewith. The magnetic pole core is formed by stacking magnetic steel plates each having a shape corresponding to the cross sectional shape of the magnetic pole core. Coils are wound around the six arm portions, and each pair of two coils located diametrically opposite with respect to the center are connected in series, whereby U-phase, V-phase, and W-phase windings for Y-connection are formed.

Figure 4:
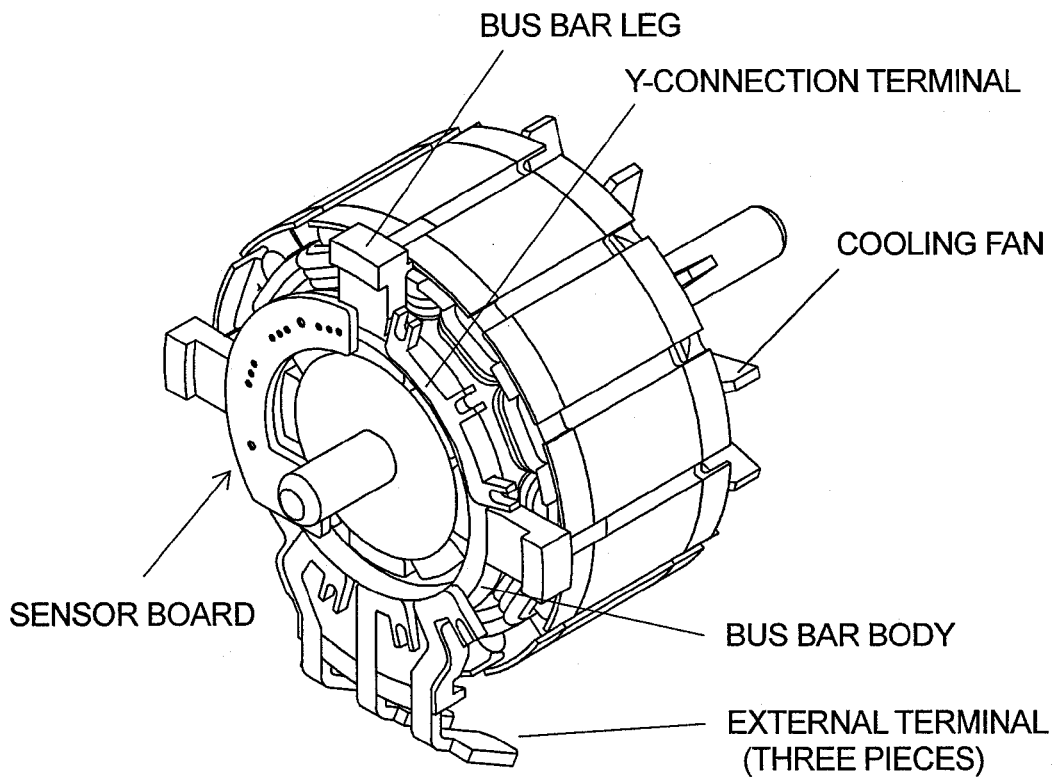
FIG. 4 is a perspective view of a motor with a bus bar attached to the stator.

FIG. 4 is a perspective view of a motor with a bus bar attached to the stator. The motor is shown in FIG. 4 as having 8 rotor magnetic poles and 12 stator magnetic poles. Although the structure of the bus bar will be described in detail later, as shown in FIG. 4, the bus bar includes a generally circular bus bar body formed of a resin, and three or more (four in FIG. 4) bus bar legs formed integrally with the bus bar body. Further, a sensor board, which carries a position detection sensor, is attached to the illustrated bus bar.

In order to provide a distance between the bus bar and the coils; i.e., in order to prevent the bus bar from coming into contact with the coils, each of the bus bar legs has a base portion extending radially outward from the bus bar body, and a distal portion axially extending from the distal end of the base portion toward the core so as to be inserted into the core grooves. Since the core groves coincide in position with the core arms in the circumferential direction, the bus bar legs are located on the core arm portions of the stator, so that the bus bar legs do not prevent the flow of cooling air flowing through the clearances between the coils along the motor axis direction. In the illustrated example, the bus bar is disposed on the side opposite the cooling fan with respect to the magnetic pole core. However, the bus bar may be disposed on the same side as the cooling fan. As shown in FIG. 1, the stator to which the bus bar has been attached is fixedly disposed within the cylindrical casing by means of press-fitting, bonding, crimping, or the like.

Figure 5A:
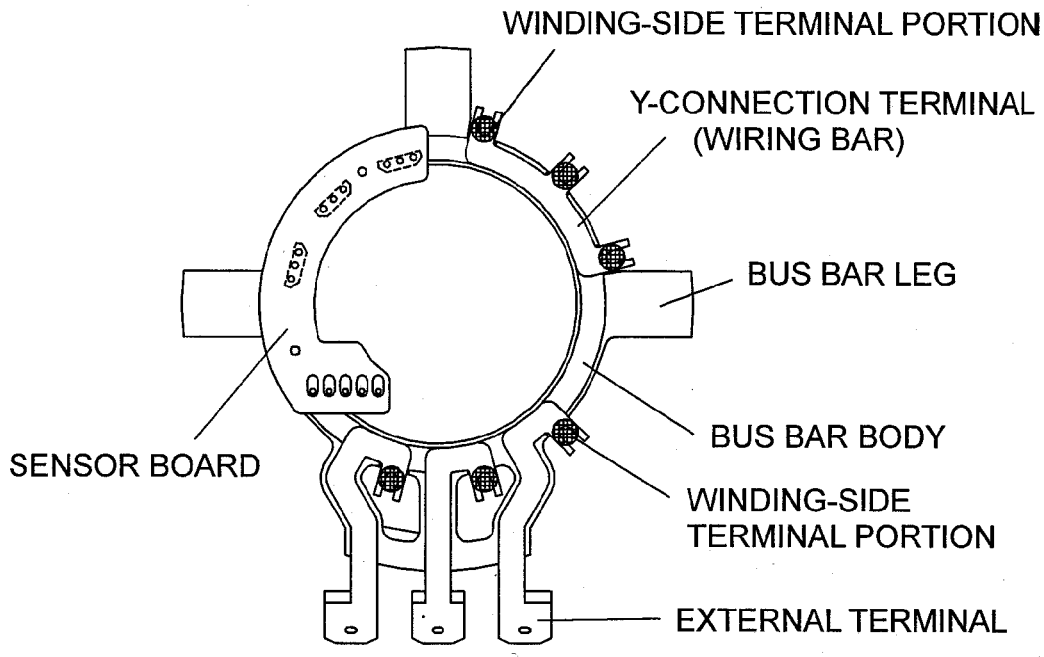
Figure 5B:
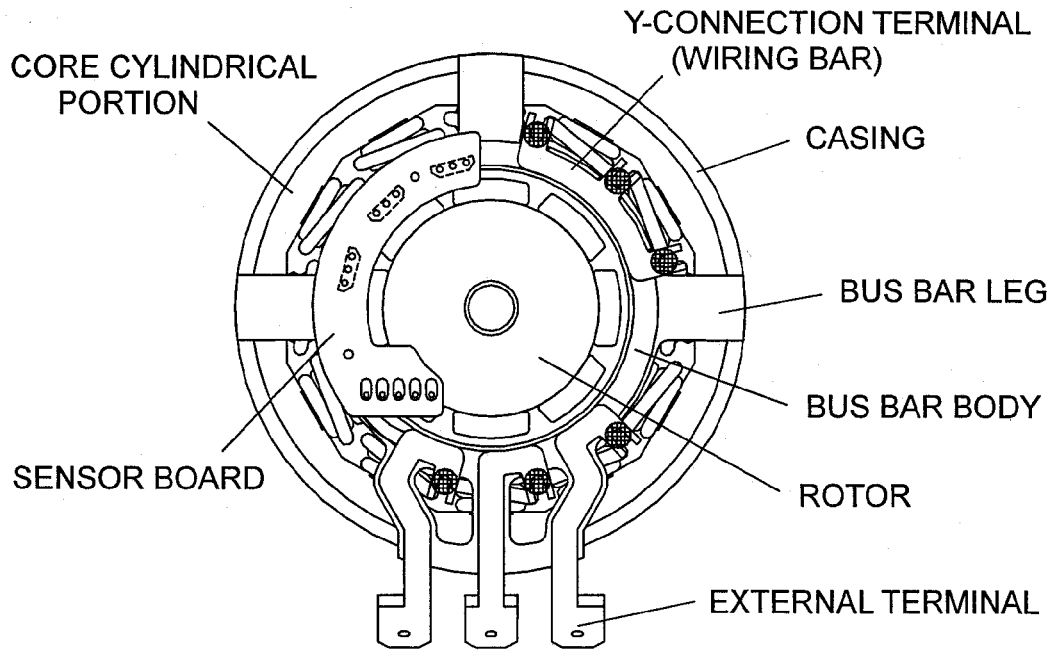

FIGS. 5A and 5B are plan views of the bus bar, wherein FIG. 5A shows the bus bar alone, and FIG. 5B shows a state in which the bus bar is attached to the motor. The bus bar is fixed in such a manner that the bus bar does not close cooling air flow passages formed in the clearances in the magnetic pole slots. In order to secure cooling air-flow passages on the radially outer side of the generally circular bus bar body, the bus bar body formed of a resin has an outer diameter smaller than the core outer diameter, and a radial length (width) such that the bus bar body does not block the inter-coil clearances. As shown in FIG. 5B, the bus bar is located at a radial position near the rotor so as form a clearance between the bus bar and the core cylindrical portion, and is disposed such that a clearance is formed between the bus bar and the coils in the motor axis direction. Therefore, the inter-coil clearances are not closed. Winding ends to be connected to six winding-side terminal portions are pulled out on the radially outer side of the bus bar body at positions near the corresponding terminals, and are connected to a Y-connection terminal and external terminals at these positions. Second ends of the three external terminals whose first ends are connected to the respective winding ends are extended outward in a generally radial direction. The Y-connection terminal whose winding-side terminal portions are connected to the respective winding ends serves as a wiring bar (copper bar) for connecting these winding ends together. In the present invention, the three winding-side terminal portions of the Y-connection terminal and the three winding-side terminal portions of the three external terminals are disposed to be located adjacent to one another (in a collective manner); and the Y-connection terminal and the external terminals are disposed such that they are located on the same side with respect to the motor center, rather than being disposed such that they are located symmetrically with respect to the motor center. By virtue of this arrangement, the wiring bars or the wiring-side terminal portions to which the winding ends are connected and which are likely to generate heat are not present at a certain circumferential position of the bus bar body. The sensor board is attached such that the position detection sensor is located at the circumferential position of the bus bar body where the wiring-side terminal portions or the wiring bars are not present.

Figure 6A:
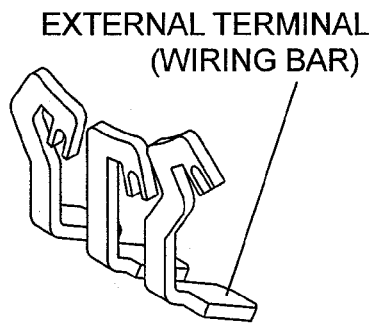
FIGS. 6A to 6E are perspective views of components of the bus bar.
Figure 6B:
Figure 6C:
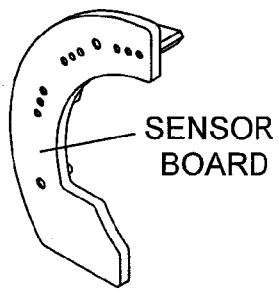
Figure 6D:
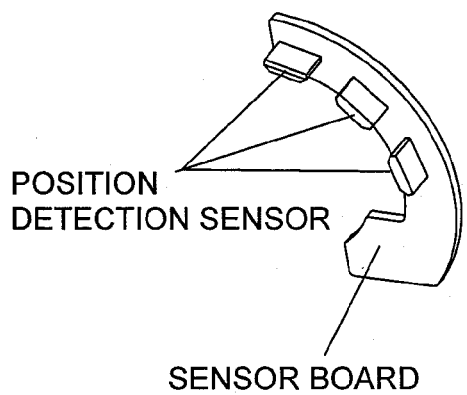
Figure 6E:
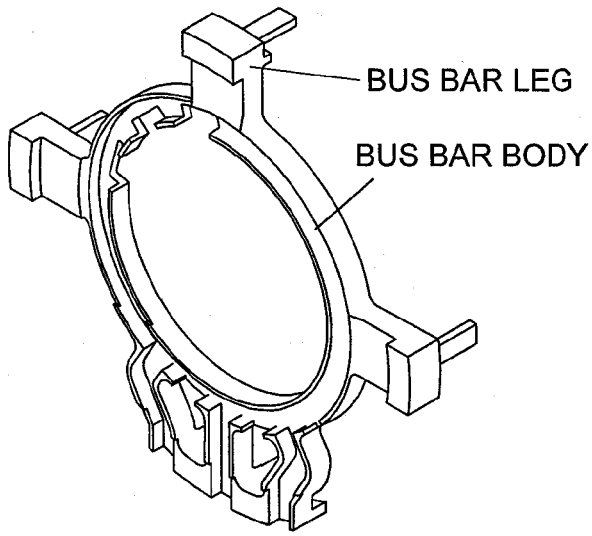
Figure 7:
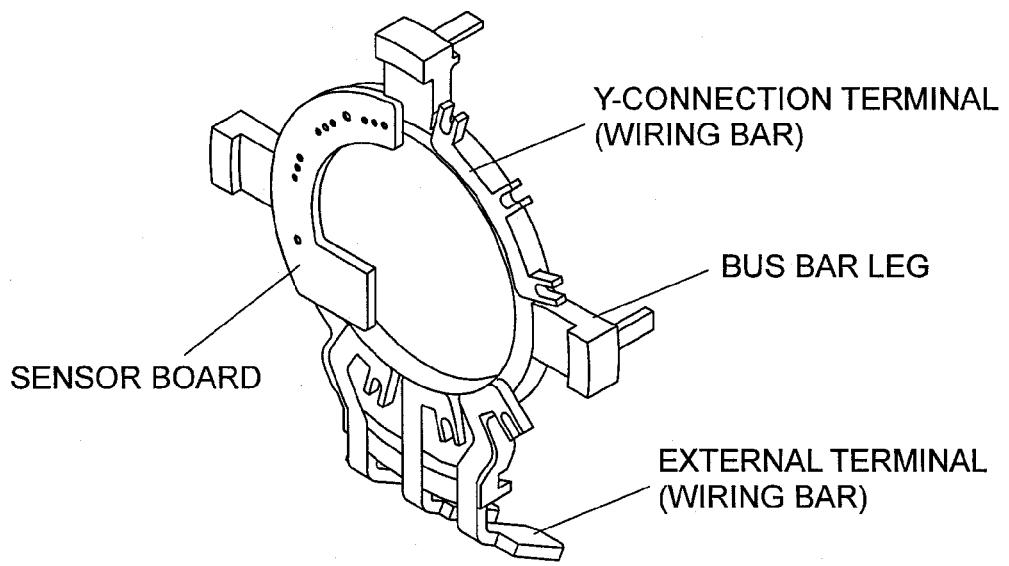
FIG. 7 is a perspective view of the bus bar, which is fabricated by assembling the components of FIGS. 6A to 6E.

FIGS. 6A to 6E are perspective views of components of the bus bar. FIG. 6A shows the three external terminals; FIG. 6B shows the Y-connection terminal (the wiring bar); FIGS. 6C and 6D show the sensor board as viewed from different directions; and FIG. 6E shows the bus bar body and the bus bar legs, which are formed of a resin. FIG. 7 is a perspective view of the bus bar, which is fabricated by assembling the components of FIGS. 6A to 6E. The external terminals and the Y-connection terminal, each composed of a wiring bar formed of a conductive metal (e.g., a tinned copper plate), are assembled into grooves of the bus bar body, which is an insulating member formed of a resin, by means of light press-fitting, bonding, or integral molding. In order to suppress heat generation, the cross sectional area of each wiring bar is made equal to or greater than that of a wire which constitutes the windings. The windings are connected (e.g., welded) to the six connection terminals (winding-side terminal portions), are Y-connected by means of the corresponding wiring bar in the bus bar body, and are connected (e.g., welded) to output lines (not shown) via the three external terminals. The sensor board fixedly supports three position detection sensors (e.g., Hall ICs or elements) provided for U, V, and W phases such that one sensor is provided for one phase. However, depending on a motor control method to be employed, provision of a single position detection sensor is sufficient. The sensor board can be positioned by means of fitting pins provided on the bus bar into holes of the board, and be fixed by means of bonding by means of adhesive, welding, or boss crimping.

The circumferential positions of the sensors in relation to the stator magnetic pole core are determined in accordance with the number of rotor magnetic poles, the number of stator magnetic poles, and the motor control method. That is, the sensors may be disposed at positions corresponding to the core grooves (core arm centers), intermediate positions therebetween, or positions shifted therefrom. In the illustrated example, all of the sensor board, the Y-connection terminal, and the external terminals are attached to the front side of the bus bar body; however, one or more of these components may be attached to the reverse side (the side attached to the magnetic pole core).

Figure 8A:
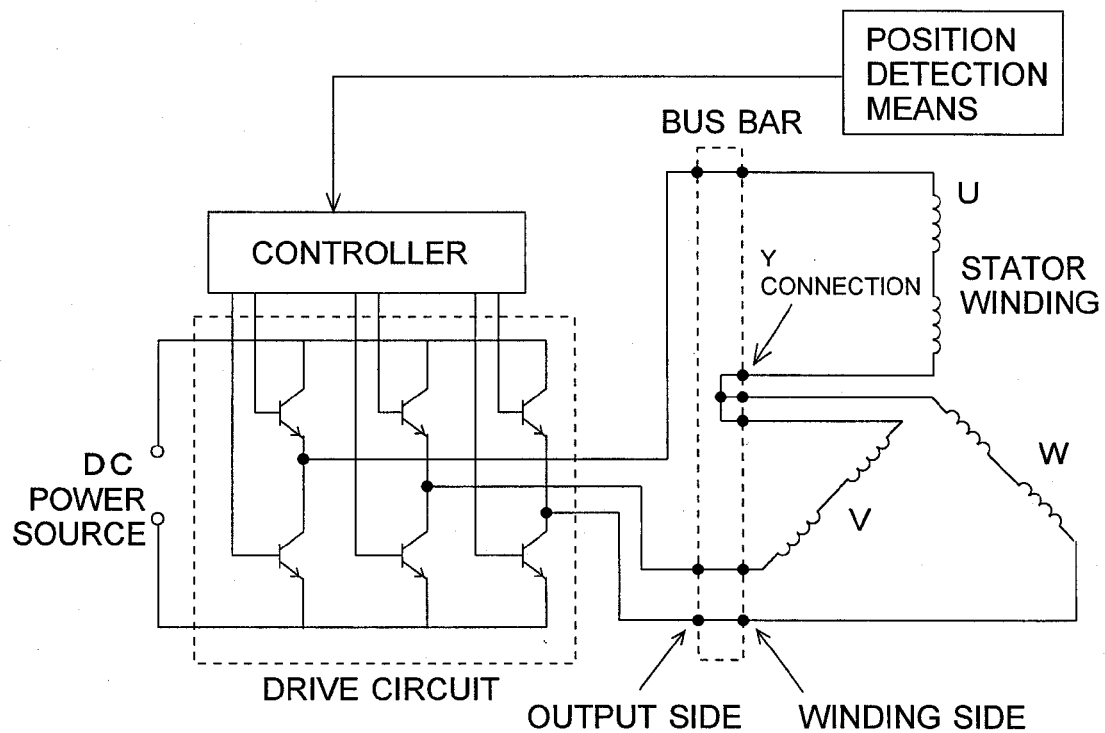
Figure 8B:
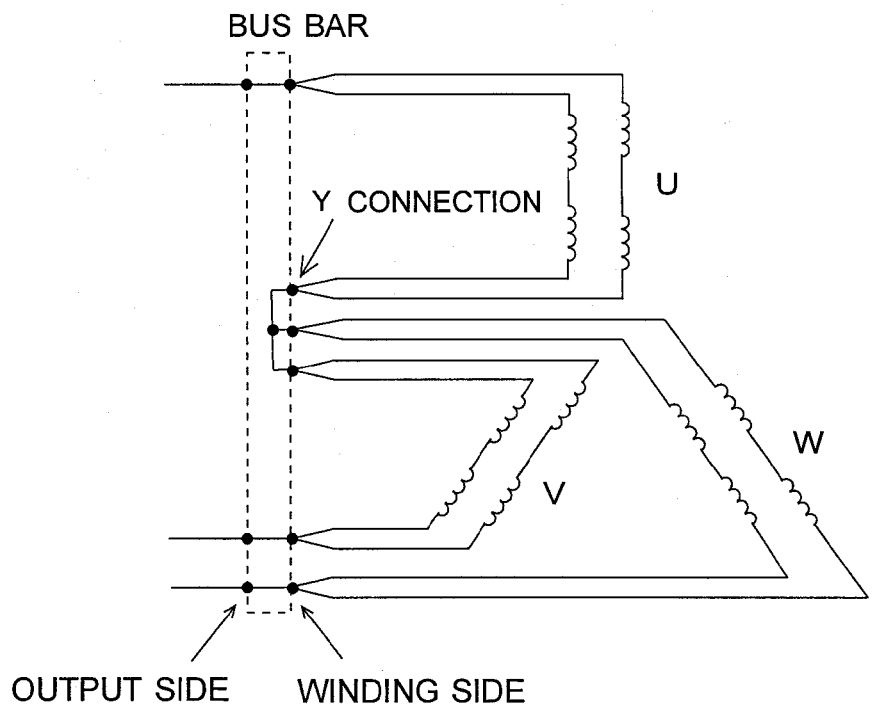

FIGS. 8A and 8B are diagrams showing electrical connection of the DC brushless motor, wherein FIG. 8A shows the overall electrical connection for the case of Y-connection (sometimes called "star connection"), and FIG. 8B shows stator windings in double Y-connection. In general, a DC brushless motor includes a plurality of stator coils which are connected in the form of a Y-connection or a D-connection, which will be described later, and therefore may be referred to as a three-phase brushless motor. In the Y-connection shown in FIG. 8A, first ends of the U-phase, V-phase, and W-phase windings, each composed of a plurality of (two in this example) coils serially connected together, are connected to the corresponding winding-side terminal portions of the bus bar, and are connected to the output-side terminals (of a drive circuit) by means of the corresponding wiring bars of the bus bar. Second ends (ends opposite to the first ends) of the U-phase, V-phase, and W-phase windings are connected to the corresponding winding-side terminal portions of the bus bar, and are connected together by means of the corresponding wiring bar of the bus bar, whereby a Y-connection is made. Alternatively, in the case of double Y-connection shown in FIG. 8B, each of the U-phase, V-phase, and W-phase windings is composed of a plurality of coils which are connected in series and in parallel.

The three external terminals of the bus bar projecting outward from the motor housing are connected to the corresponding output lines of the drive circuit, and are then connected to a DC power source via the drive circuit. The drive circuit is formed from six switching transistors as shown in FIG. 8A. A controller which switches and controls the switching transistors of the drive circuit performs the switching control on the basis of a signal from position detection means (the position detection sensor) which detects the rotational position of the motor.

Mutual connection between a plurality of coils which constitute each of the U-phase, V-phase, and W-phase windings is performed without use of the internal wiring of the bus bar. In this case, connection between coils in serial connection, such as those between the winding-ending-side end of the first coil and the winding-starting-side end of the second coil, and the winding-ending-side end of the second coil and the winding-starting-side end of the third coil, can be performed by means of direct connection. This direct connection is performed in such a manner that the conducive wires are routed on the bus bar attachment side of the stator, or are routed on the end surface of the stator opposite the bus bar attachment side (the end surface on the side where the cooling fan shown in FIG. 1 is present). The first and second ends of the winding of each phase, composed of a plurality of coils, are pulled out in the vicinity of the corresponding Y-connection and external terminals, and are connected to the corresponding terminals. As described above, the bus bar for Y-connection or double Y-connection includes, as electrically conductive members (connection terminals) for connecting the windings, only three external terminals for leading ends of the U-phase, V-phase, and W-phase windings to an external power source, and one Y-connection terminal for connecting the opposite ends of the windings together. In the case of the illustrated bus bar, the first and second ends of each of the three phase windings are pulled out to the vicinity of the winding-side terminal portions of the three external terminals and the Y-connection terminal. Therefore, wiring bars which are long in the circumferential direction are not needed, although a wiring bar for mutually connecting the three winding-side terminal portions of the Y-connection terminal and wiring bars for the external terminals are required. As a result, the generally circular bus bar body of the present invention includes an unused circumferential portion in which no conductive member is provided. According to the present invention, the position detection sensor board is attached such that the position detection sensor is located at the unused circumferential portion. Therefore, even when the conductive members (the wiring bars and the connection terminals) generate heat, the generated heat is prevented from adversely affecting the position detection sensor.

Figure 9A:
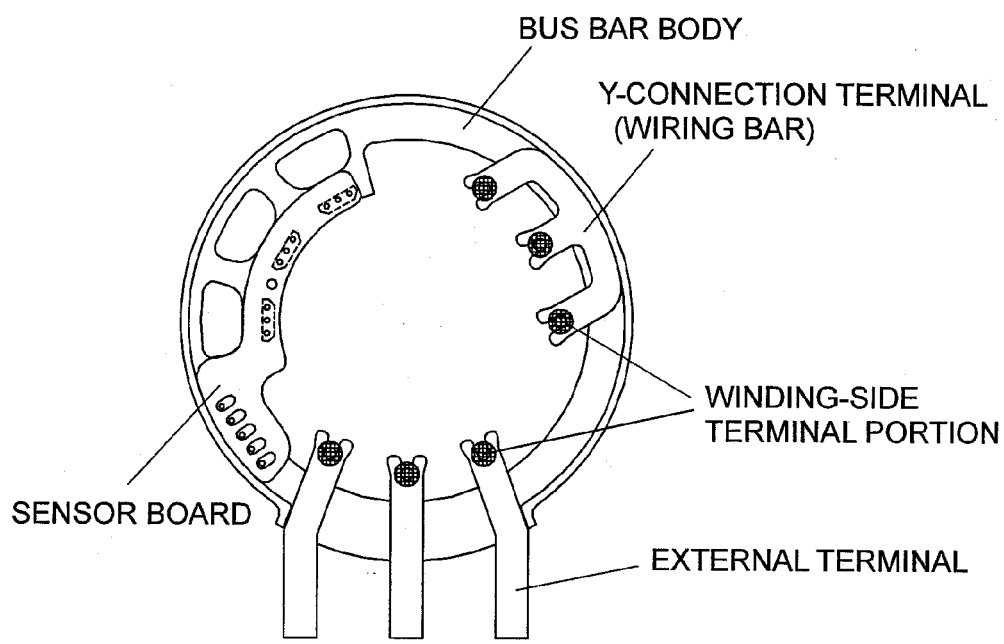
Figure 9B:
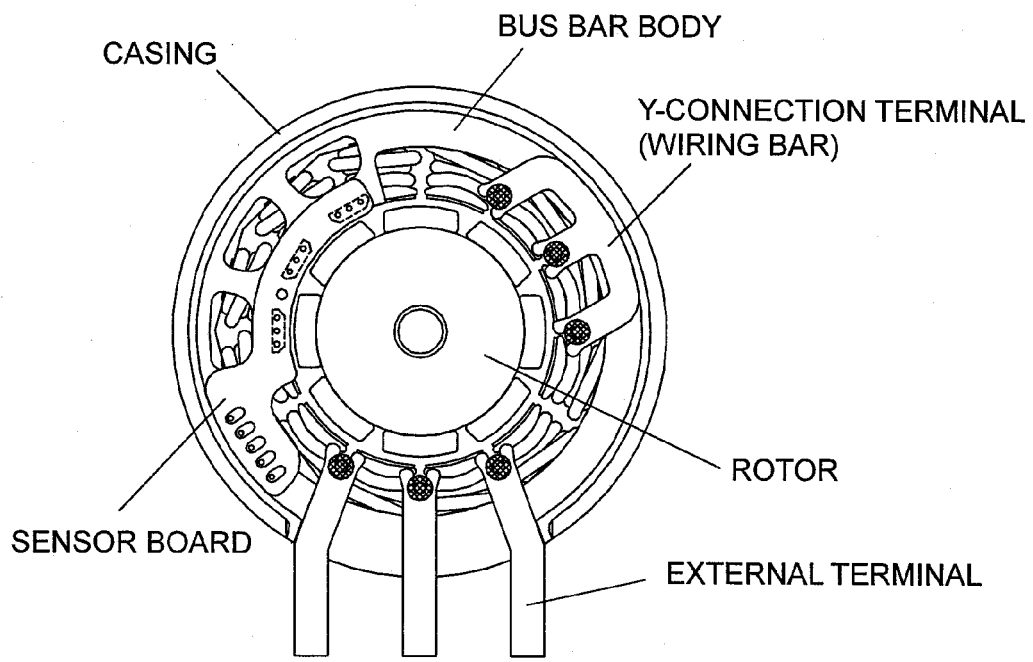

FIGS. 9A and 9B are plan views of a bus bar different from the bus bar of FIGS. 5A and 5B, wherein FIG. 9A shows the bus bar alone, and FIG. 9B shows a state in which the bus bar is attached to the motor. The generally circular bus bar body is disposed within the cylindrical casing at a radial position corresponding to the core cylindrical portion, and has a length in the radial direction determined such that the bus bar body does not block the inter-coil clearances. The illustrated bus bar differs from the bus bar shown in FIG. 5 in that the outer diameter of the body portion is made closer to that of the core cylindrical portion in order to secure a cooling air flow passage on the radially inner side of the bus bar body. However, the bus bar can be fixed in a manner similar to that for the bus bar shown in FIG. 5. That is, the bus bar includes a generally circular bus bar body formed of a resin, and three or more bus bar legs formed integrally with the bus bar body. The bus bar legs are fixedly inserted into core grooves axially extending on the outer circumferential surface of the magnetic pole core; and the stator, to which the bus bar has been attached, is fixedly disposed within the cylindrical casing.

Winding ends to be connected to respective winding-side terminal portions are pulled out on the radially inner side of the bus bar body at positions near the corresponding terminals, and are connected to a Y-connection terminal and external terminals at these positions. Second ends of the three external terminals whose first ends are connected to the respective winding ends are extended outward in a generally radial direction. The Y-connection terminal whose winding-side terminal portions are connected to the respective winding ends serves as a wiring bar (copper bar) for connecting these winding ends together. Similar to the configuration shown in FIG. 5, a sensor board is attached to the bus bar body at a certain circumferential position such that a position detection sensor attached thereto is separated from the conductive members (wiring bars and connection terminals).

Figure 10A:
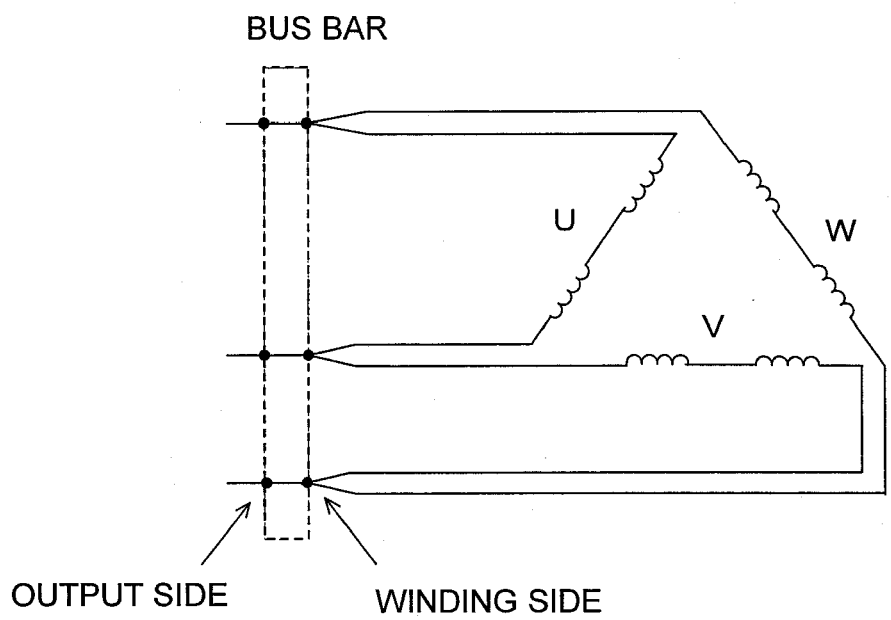
FIG. 10A is a diagram showing stator windings in D-connection.
Figure 10B:
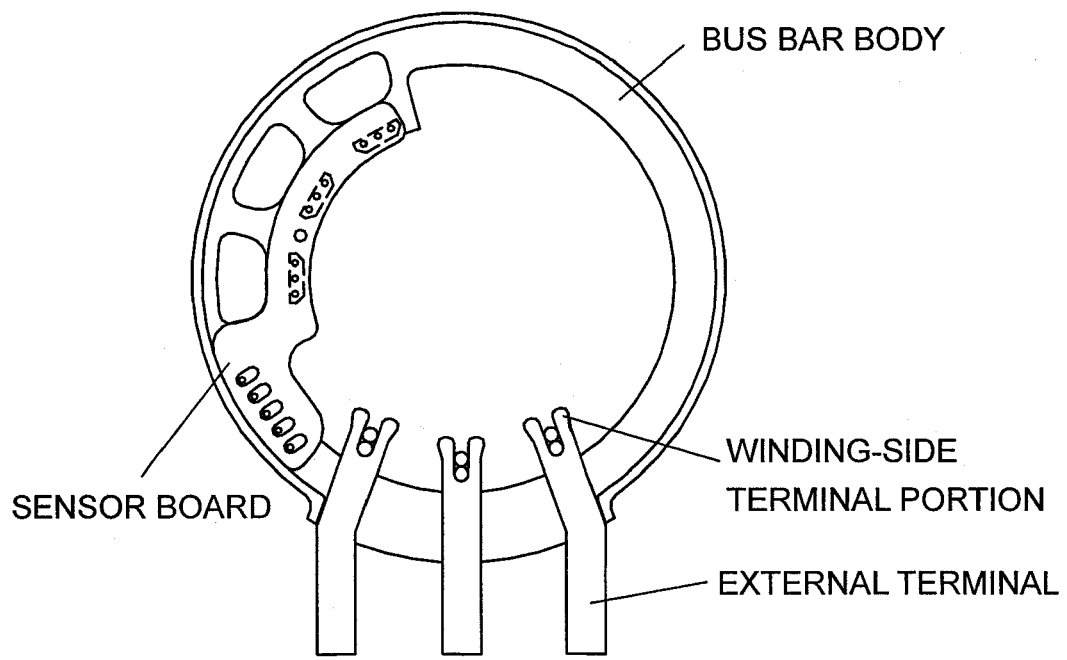
FIG. 10B is a view showing a bus bar therefor.

The present invention can be applied to a D-connection-type DC brushless motor. FIG. 10A is a diagram showing stator coils in D-connection, and FIG. 10B is a view showing a bus bar therefor. In the D-connection, first and second ends of the U-phase, V-phase, and W-phase windings, each composed of a plurality of (two in this example) coils serially connected together, are connected such that the second end of the U-phase winding and the first end of the V-phase winding are connected together, the second end of the V-phase winding and the first end of the W-phase winding are connected together, and the second end of the W-phase winding and the first end of the V-phase winding are connected together. The three external terminals of the bus bar projecting outward from the motor housing are connected to the corresponding output lines of the drive circuit, and are then connected to a DC power source via the drive circuit in a manner similar to that having been described with reference to FIG. 8A.

Mutual connection between a plurality of coils which constitute each of the U-phase, V-phase, and W-phase windings is performed without use of the internal wiring of the bus bar. In this case, connection between coils in serial connection, such as those between the winding-ending-side end of the first coil and the winding-starting-side end of the second coil, and the winding-ending-side end of the second coil and the winding-starting-side end of the third coil, can be performed by means of direct connection. The first and second ends of the winding of each phase, composed of a plurality of coils, are pulled out in the vicinity of the corresponding winding-side terminal portions of the bus bar external terminals, and are connected to the corresponding terminals. As described above, the bus bar for D-connection includes, as electrically conductive members (connection terminals) for connecting the windings, only three external terminals for leading the first and second ends of the U-phase, V-phase, and W-phase windings to an external power source. As a result, similar to the case of the above-described Y-connection, the generally circular bus bar body includes an unused circumferential portion in which no conductive member is provided, and the sensor board is attached such that the position detection sensor is located at the unused circumferential portion.

The bus bar shown in FIG. 10B is configured such that the bus bar body is located on the radially outer side of the winding-side terminal portions. This configuration is similar to that having been described with reference to FIG. 9A, except for the arrangement of the conductive members. However, the bus bar may be configured such that the bus bar body is located on the radially inner side of the winding-side terminal portions as shown in FIG. 5A. The bus bar for D-connection does not require the Y-connection terminal used for Y-connection. The first and second ends of the windings are pulled out on the radially inner side (or the radially outer side) of the bus bar body at positions near the corresponding terminals and are connected to the corresponding winding-side terminal portions of the external terminals. Second ends of the three external terminals whose first ends are connected to the respective winding ends are extended outward in a generally radial direction. The sensor board is attached to the bus bar body at a certain circumferential position such that the position detection sensor attached thereto is separated from the conductive members (the three external terminals).

Figure 11A:
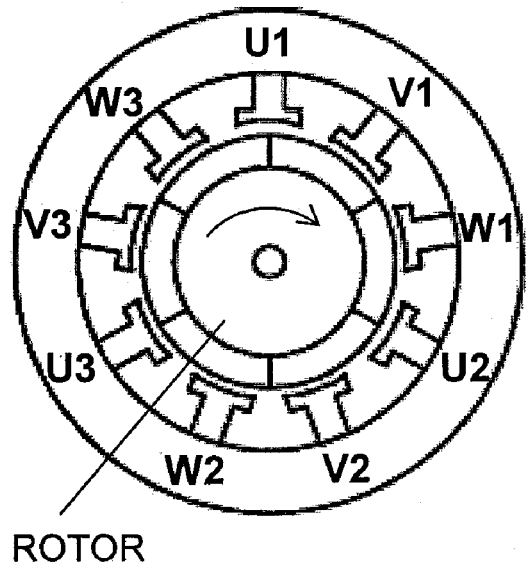
FIGS. 11A and 11B are views showing windings of a brushless motor.
Figure 11B:
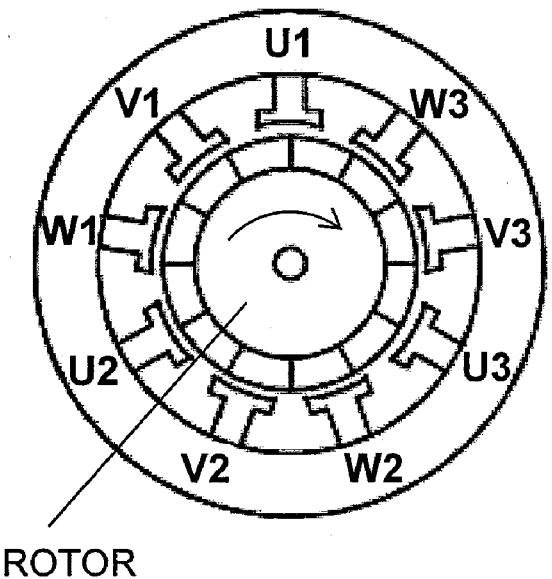
Figure 12:
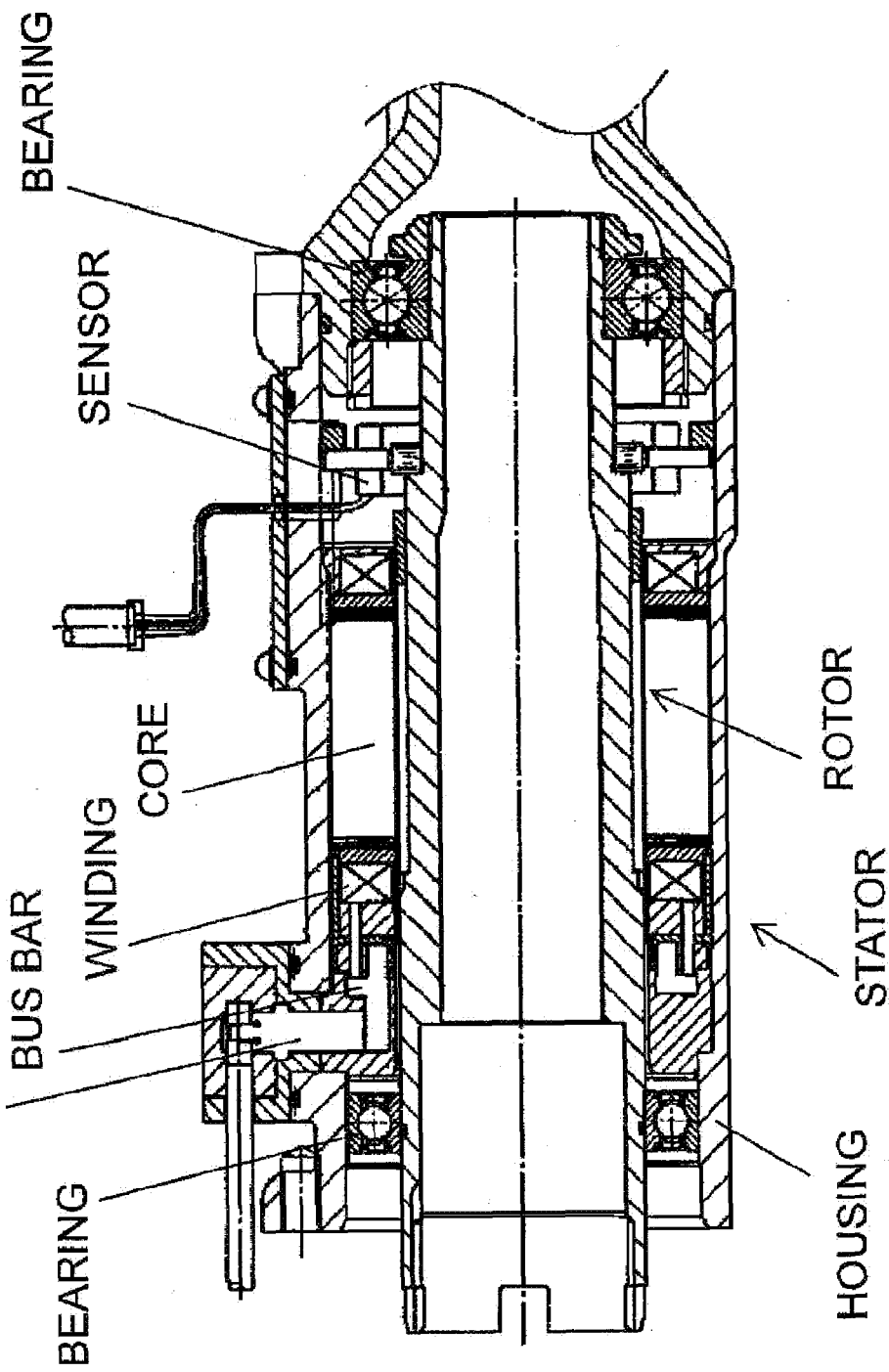
FIG. 12 is a longitudinal cross section of a motor disclosed in Japanese Patent Application Laid-Open No. 2002-125353.
Figure 13:
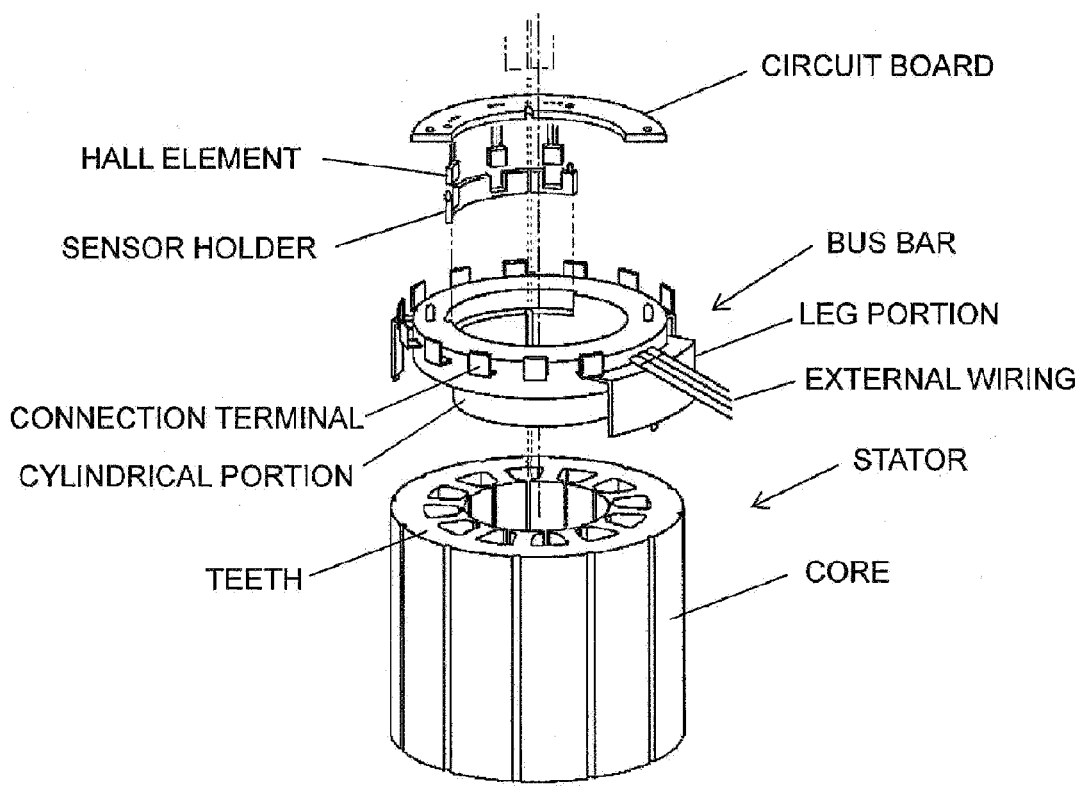
FIG. 13 is a perspective view showing a portion of the structure of a stator which is fitted into a housing of a brushless motor disclosed in Japanese Patent Application Laid-Open No. 2006-94573.

FIG. 11A is a view showing the windings of a brushless motor having 6 rotor magnetic poles and 9 stator magnetic poles. FIG. 11B is a view showing the windings of a brushless motor having 12 rotor magnetic poles and 9 stator magnetic poles. As described above, in the present invention, only a Y-connection terminal (for the case of Y-connection or double Y-connection) and external terminals are disposed, as conductive members, on the generally circular bus bar body such that the bus bar body has an unused circumferential portion where wiring bars are not disposed; and the six winding ends in total are pulled out to positions near the corresponding terminals and are connected thereto. For example, in a motor structure as shown in FIG. 11A or 11B, the winding of each phase is formed by continuously winding three serial coils. When the winding is started from coil U1 (V1, W1), the winding is then performed for coil U2 (V2, W2) and is ended at coil U3 (V3, W3), adjacent to the first coil. For example, in the case where the winding-starting-side end is connected to the corresponding external terminal and the winding-ending-side end is connected to the Y-connection terminal, the opposite ends of the coils U2, V2, and W2 are connected directly to the corresponding adjacent coils, and are not required to be connected to the bus bar terminals. Therefore, an unused region is naturally formed on the bus bar body to correspond to the coils U2, V2, and W2; and the sensor board can be attached such that the position detection sensor is located in the unused region.

The structure which enables the coils of three phases to be continuously wound in the order of UVW or UWV is not limited to those shown in FIGS. 11A and 11B. In general, such continuous winding can be performed in structures in which the number of rotor magnetic poles is 2n and the number of stator magnetic poles is 3n, or the number of rotor magnetic poles is 4n and the number of stator magnetic poles is 3n, where n is an integer of 2 to 6. In the example shown in FIG. 11A, which have such a structure, the coils U2, V2, W2 are connected only to adjacent coils, and are not required to be connected to the bus bar terminals. In addition, since the coils U2, V2, W2 are disposed adjacent to each other, in the case of the illustrated example in which the number of stator magnetic poles is 9, there can be formed an unused region which extends over about one-third of the entire circumference of the bus bar body.

The reason for setting the integer n equal to or greater than 2 is as follows. When n=2, the number of stator core magnetic poles becomes 6. Therefore, in the case of D-connection, three external terminals and three sensor elements can be disposed, while being separated from one another, without causing any problem. However, in the case of Y-connection or double Y-connection, as described above, three external terminals to which first ends of the windings are connected, one Y-connection terminal to which second ends of the windings are connected, and three sensor elements must be disposed on the bus bar. In order to dispose these components, while separating them from one another, at least a space corresponding to nine stator core magnetic poles (3 £ n) is required.

The reason for setting the integer n equal to or less than 6 is as follows. When n>6; i.e., when the number of stator core magnetic poles is greater than 18, there arise demerits such as increased motor size, increased cost (an increase in the number of expensive magnets, an increase in the number of manufacturing steps, and an increased time required for achieving satisfactory accuracy), and difficulty in attaining cogging performance (due to an increased number of rotor magnetic poles, attachment accuracy varies among magnets, so that the motor performance deteriorates).

The structures shown in FIGS. 11A and 11B enable the winding-side terminal portions of the bus bar to be disposed near the winding-starting-side end and winding-ending-side end of each phase winding. Therefore, these structures are advantageous in that the winding-starting-side end and winding-ending-side end can be connected to the winding-side terminal portions of the bus bar, without conductive wires being routed. However, even in the case where the winding-starting-side end and winding-ending-side end of each phase winding are pulled out to positions separated from the winding-side terminal portions of the bus bar (for example, in the case where the number of rotor magnetic poles is 4 and the number of stator magnetic poles is 6), the wiring ends can be connected to the winding-side terminal portions of the bus bar by extending the wires at the winding ends; i.e., by use of connecting wires for routing.

What is claimed is:

1. An inner-rotor-type brushless motor comprising a stator fixedly disposed within a motor casing; a rotor fixed to a rotation shaft; and a bus bar which connects together U-phase, V-phase, and W-phase windings wound on a stator magnetic pole core and connects them to output wires, wherein the U-phase, V-phase, and W-phase windings are each composed of a plurality of coils which are wound around stator magnetic poles and are connected to form a Y-connection or a double Y-connection;

the bus bar, which carries a sensor board including a position detection sensor fixed thereto, includes a generally circular bus bar body formed of a resin, and bus bar legs formed integrally with the bus bar body and used for fixing the bus bar;

the bus bar includes, as conductive members for connecting the windings, only three external terminals connected to first ends of the windings and one Y-connection terminal for connecting second ends of the windings together;

the first and second ends of the windings are pulled out to positions near winding-side terminal portions of the Y-connection and external terminals to which the first and second ends are to be connected, and are connected to the corresponding Y-connection and external terminals;

the three winding-side terminal portions of the Y-connection terminal are disposed to be located adjacent to one another, the winding-side terminal portions of the three external terminals are disposed to be located adjacent to one another, and the Y-connection terminal and the external terminals are disposed to be located on one side on the circumference of the bus bar body, whereby the bus bar body has a circumferential region where the conductive members are not present; and the sensor board is attached such that the position detection sensor is located in the circumferential region where the conductive members are not present.

2. An inner-rotor-type brushless motor according to claim 1, wherein the stator, to which the bus bar is fixed by inserting the plurality of bus bar legs into core grooves, is fixedly disposed within the casing having a cylindrical shape.

3. An inner-rotor-type brushless motor according to claim 1, wherein the bus bar body has a length in the radial direction determined such that the bus bar body does not block inter-coil clearances, and wherein the bus bar body is disposed at a radial position near the rotor so as to form a clearance between the bus bar body and a cylindrical portion of the core, and the first and second ends of the windings are pulled out on the radially outer side of the bus bar body for connection; or the bus bar body is disposed at a radial position corresponding to the cylindrical portion of the core, and the first and second ends of the windings are pulled out on the radially inner side of the bus bar body for connection.

4. An inner-rotor-type brushless motor according to claim 1, wherein mutual connection between the plurality of coils which constitute each of the U-phase, V-phase, and W-phase windings is performed by means of direct serial connection such that a winding-ending-side end of a first coil and a winding-starting-side end of a second coil are serially connected, a winding-ending-side end of the second coil and a winding-starting-side end of a third coil are serially connected, and so on; and the coils of three phases are continuously wound in the order of U-phase, V-phase, and W-phase or in the order of U-phase, W-phase, and V-phase.

5. An inner-rotor-type brushless motor according to claim 4, wherein the number of rotor magnetic poles is 2n and the number of stator magnetic poles is 3n, or the number of rotor magnetic poles is 4n and the number of stator magnetic poles is 3n, where n is an integer of 2 to 6; and winding for each phase ends at a coil adjacent to a coil from which the winding has been started.

6. An inner-rotor-type brushless motor comprising a stator fixedly disposed within a motor casing; a rotor fixed to a rotation shaft; and a bus bar which connects together U-phase, V-phase, and W-phase windings wound on a stator magnetic pole core and connects them to output wires, wherein the U-phase, V-phase, and W-phase windings are each composed of a plurality of coils which are wound around stator magnetic poles and are connected to form a D-connection;

the bus bar, which carries a sensor board including a position detection sensor fixed thereto, includes a generally circular bus bar body formed of a resin, and bus bar legs formed integrally with the bus bar body and used for fixing the bus bar;

the bus bar includes only three external terminals as conductive members for connecting the windings;

the three external terminals include integrally-formed winding-side terminal portions, each connecting two of the first and second ends of the windings together;

the first and second ends of the U-phase, V-phase, and W-phase windings are pulled out to positions near the winding-side terminal portions to which the first and second ends are to be connected, and are connected thereto so that the U-phase, V-phase, and W-phase windings form a D-connection;

the three external terminals are disposed on the bus bar body such that the external terminals are located adjacent to one another, whereby the bus bar body has a circumferential region where the conductive members are not present; and the sensor board is attached such that the position detection sensor is located in the circumferential region where the conductive members are not present.

7. An inner-rotor-type brushless motor according to claim 6, wherein the stator, to which the bus bar is fixed by inserting the plurality of bus bar legs into core grooves, is fixedly disposed within the casing having a cylindrical shape.

8. An inner-rotor-type brushless motor according to claim 6, wherein the bus bar body has a length in the radial direction determined such that the bus bar body does not block inter-coil clearances, and wherein the bus bar body is disposed at a radial position near the rotor so as to form a clearance between the bus bar body and a cylindrical portion of the core, and the first and second ends of the windings are pulled out on the radially outer side of the bus bar body for connection; or the bus bar body is disposed at a radial position corresponding to the cylindrical portion of the core, and the first and second ends of the windings are pulled out on the radially inner side of the bus bar body for connection.

9. An inner-rotor-type brushless motor according to claim 6, wherein mutual connection between the plurality of coils which constitute each of the U-phase, V-phase, and W-phase windings is performed by means of direct serial connection such that a winding-ending-side end of a first coil and a winding-starting-side end of a second coil are serially connected, a winding-ending-side end of the second coil and a winding-starting-side end of a third coil are serially connected, and so on; and the coils of three phases are continuously wound in the order of U-phase, V-phase, and W-phase or in the order of U-phase, W-phase, and V-phase.

10. An inner-rotor-type brushless motor according to claim 9, wherein the number of rotor magnetic poles is 2n and the number of stator magnetic poles is 3n, or the number of rotor magnetic poles is 4n and the number of stator magnetic poles is 3n, where n is an integer of 2 to 6; and winding for each phase ends at a coil adjacent to a coil from which the winding has been started.

* * * * *